United States Patent
Mitchell

(10) Patent No.: US 9,459,145 B1
(45) Date of Patent: Oct. 4, 2016

(54) OPTICAL RELAY WITH ADJUSTABLE MAGNIFICATION

(71) Applicant: Thomas A. Mitchell, Nazareth, PA (US)

(72) Inventor: Thomas A. Mitchell, Nazareth, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 0 days.

(21) Appl. No.: 14/212,489

(22) Filed: Mar. 14, 2014

Related U.S. Application Data

(60) Provisional application No. 61/792,375, filed on Mar. 15, 2013.

(51) Int. Cl.
*G01J 3/28* (2006.01)
*G01J 3/02* (2006.01)
*G02B 15/14* (2006.01)

(52) U.S. Cl.
CPC ............. *G01J 3/0237* (2013.01); *G02B 15/14* (2013.01)

(58) Field of Classification Search
CPC .............. G01J 3/28; G01J 3/18; G02B 9/62; G02B 15/14
See application file for complete search history.

(56) References Cited

U.S. PATENT DOCUMENTS

| | | | |
|---|---|---|---|
| 7,595,875 B1 * | 9/2009 | Mitchell | 356/328 |
| 2002/0126397 A1 * | 9/2002 | Fujimoto | 359/762 |
| 2004/0227940 A1 * | 11/2004 | Mitchell | 356/328 |
| 2011/0141575 A1 * | 6/2011 | Muratani et al. | 359/680 |

* cited by examiner

*Primary Examiner* — Tarifur Chowdhury
*Assistant Examiner* — Jamil Ahmed
(74) *Attorney, Agent, or Firm* — Burns & Levinson LLP; Orlando Lopez

(57) ABSTRACT

The present disclosure provides an optical imaging system with adjustable magnification. In one aspect, the optical imager, which defines an optical axis, includes an object plane and an image plane, an optical sub-system located along the optical axis and optically disposed between the object plane and the image plane, the optical sub-system being configured to substantially image electromagnetic radiation emanating from the object plane onto the image plane, and at least one detecting element located substantially at the image plane. In one example, the object plane and the image plane are separated by a fixed distance. In one example, the optical sub-system is configured to mechanically translate along the optical axis.

10 Claims, 4 Drawing Sheets

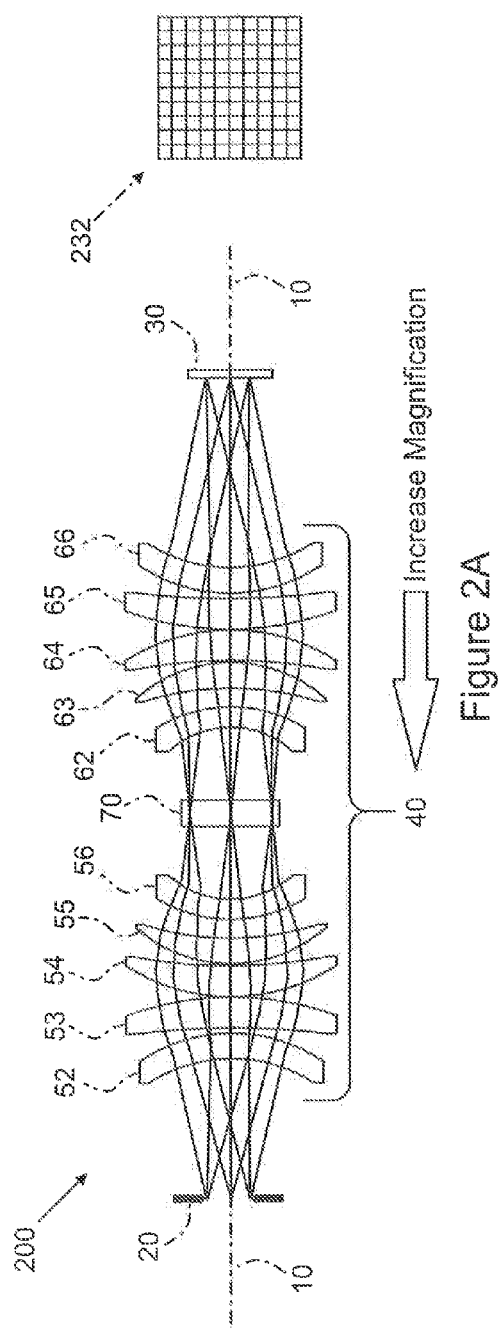
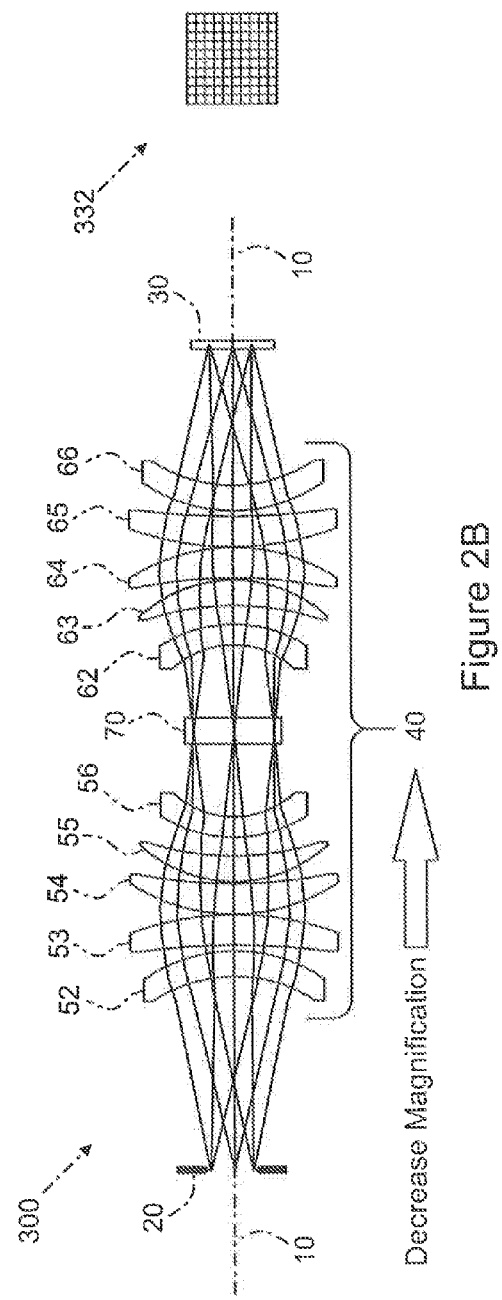
Figure 2A
Figure 2B

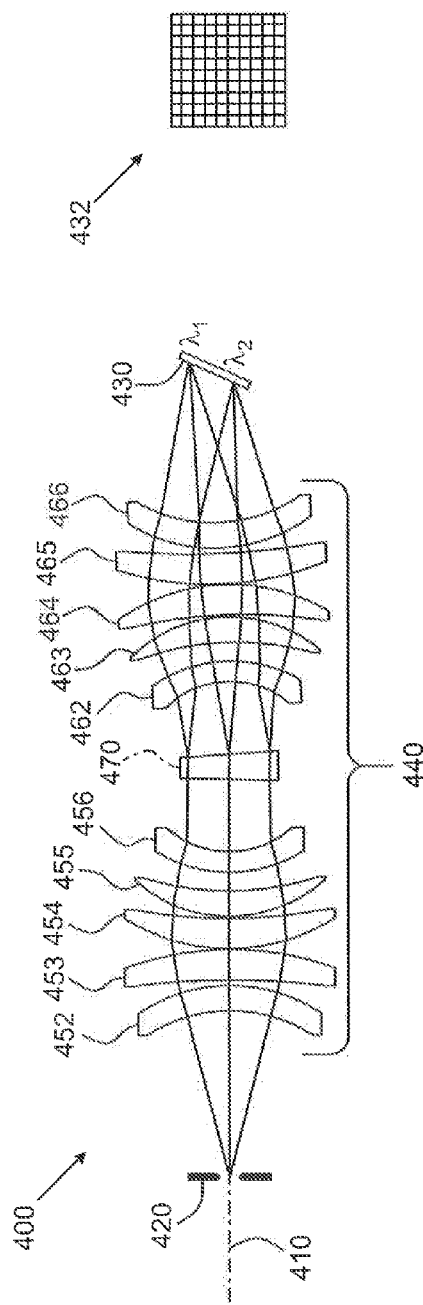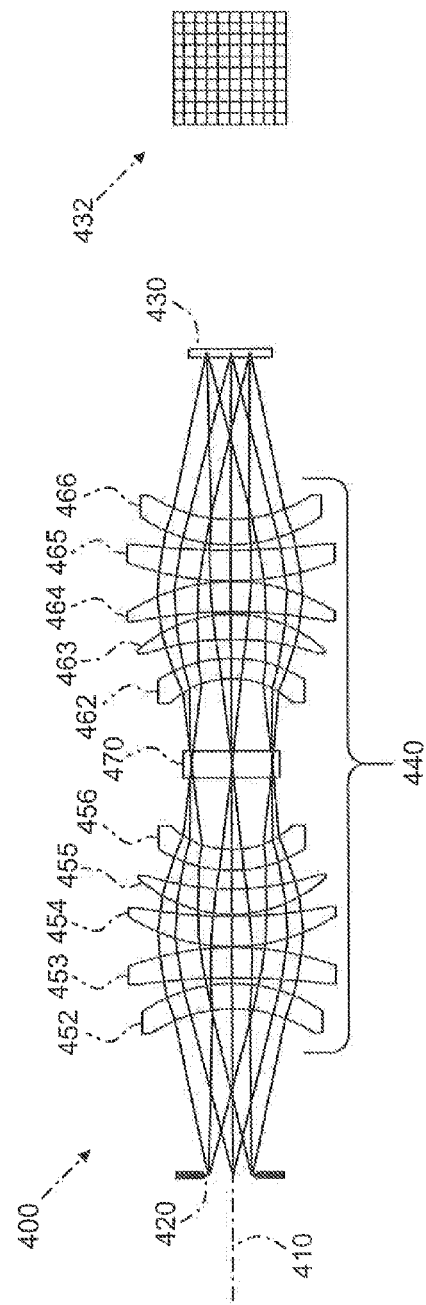

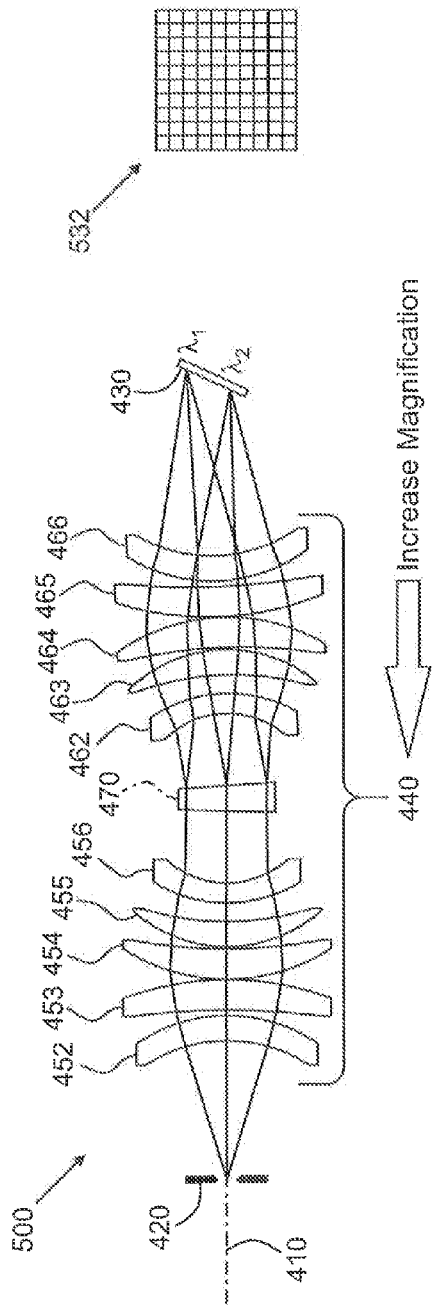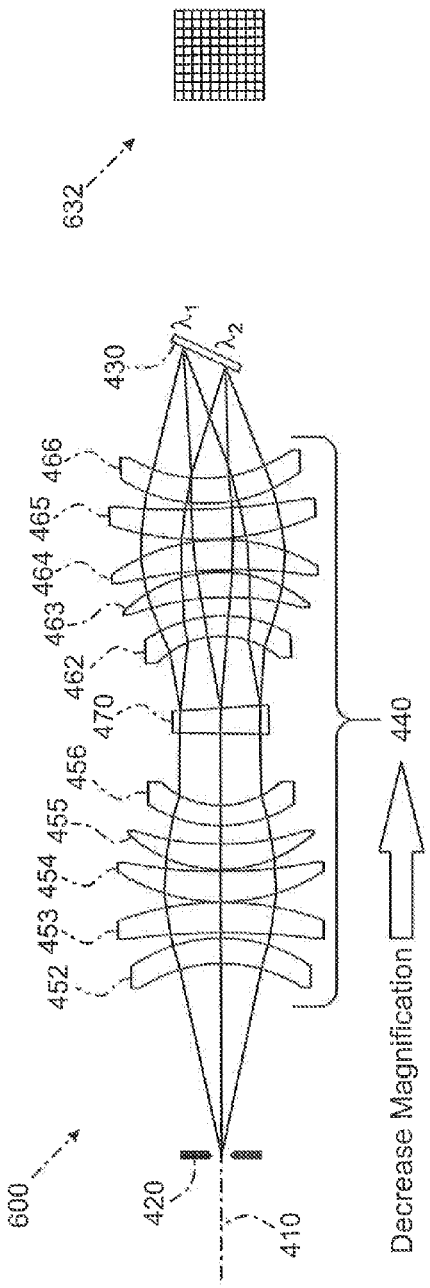
Figure 4A
Figure 4B

OPTICAL RELAY WITH ADJUSTABLE MAGNIFICATION

CROSS-REFERENCE TO RELATED APPLICATIONS

This application claims priority to U.S. Provisional Application No. 61/792,375, filed on Mar. 15, 2013, which is incorporated by reference herein in its entirety and for all purposes.

BACKGROUND

These teachings relate generally to relay imagers and spectrometers. More particularly, these teachings relate to relay imagers and spectrometer designs which have adjustable spatial or spectral magnification.

Relay imagers have been used in optical spectrometers and other applications. In the conventional designs, the relay imagers have constant spatial and spectral magnification. Accordingly, there is a need for relay and spectrometer designs that have adjustable spatial and spectral magnification.

SUMMARY

Various embodiments of the present disclosure provide relay imagers and spectrometers with adjustable spatial and spectral magnification.

Characteristics of these teachings provide a relay imager design that has adjustable spatial magnification.

Characteristics of these teachings provide a spectrometer design that has adjustable spatial magnification.

Characteristics of these teachings provide a spectrometer design that has adjustable spectral magnification.

Further characteristics of these teachings to provide a spectrometer design that is compact in size.

Still further characteristics of these teachings provide a spectrometer design that has a combination of the characteristics described above with superior trade-offs than have been previously attainable.

For better understanding of these teachings, reference is made to the accompanying drawings and detailed description.

BRIEF DESCRIPTION OF THE DRAWINGS

FIGS. 2A and 2B are schematic views of an optical imaging system, taken along an optical axis of the optical imaging system, in accordance with an embodiment of the present disclosure;

FIGS. 3A and 3B are schematic views of a compact refractive relay spectrometer, taken along an optical axis of the spectrometer in the plane parallel to and perpendicular to the direction of dispersion respectively; and FIGS. 4A and 4B are schematic views of an optical imaging system, taken along an optical axis of the optical imaging system in the plane parallel to the direction of dispersion, in accordance with an embodiment of the present disclosure and its scope will be pointed out in the appended claims.

DETAILED DESCRIPTION

Figure 1:
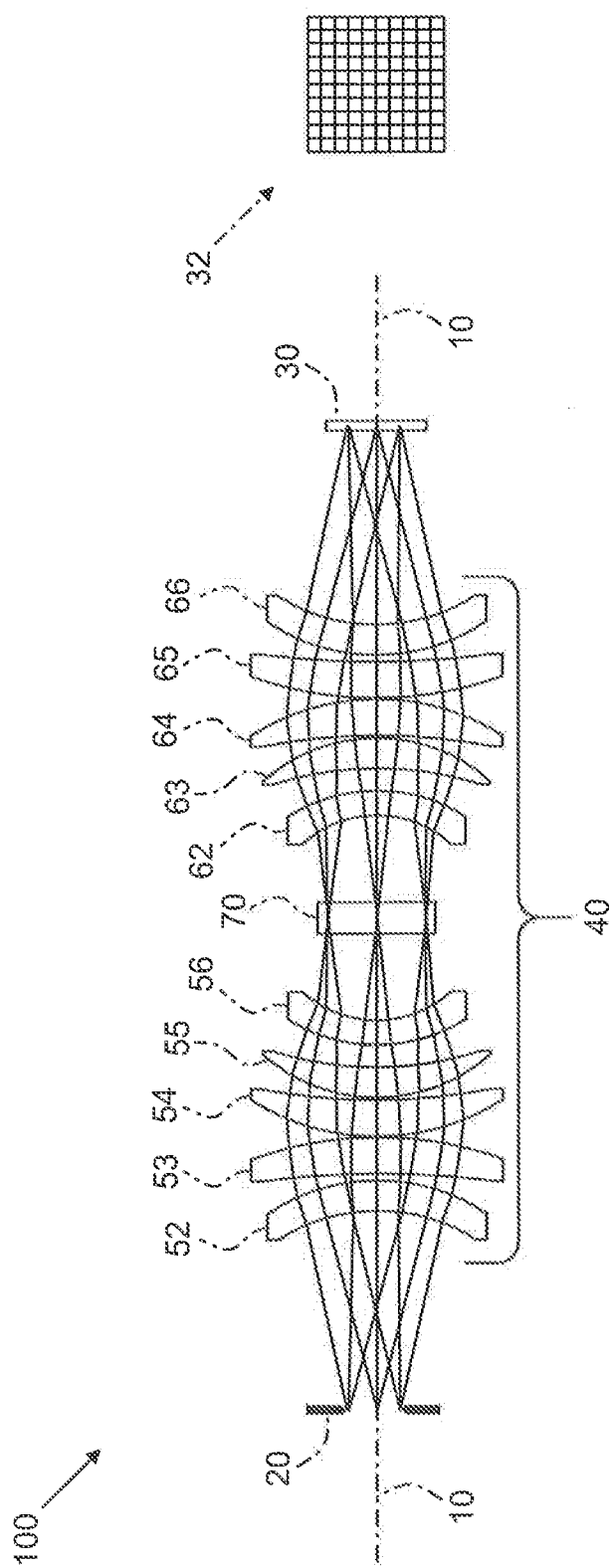
FIG. 1 is a schematic view of a relay imaging system, taken along an optical axis of the relay imaging system.

Relay and spectrometer designs that have adjustable spatial and spectral magnification are disclosed hereinbelow.

Reference is made to FIG. 1, which is a schematic sectional view of a relay imaging system 100, taken along its optical axis 10. Electromagnetic radiation, typically in the ultraviolet, visible, and/or infrared bands, hereinafter referred to generally as light, emitted or reflected by a given object, either real or virtual, hereinafter referred to generally as the source, located at the object plane 20 is re-imaged to a focus position, hereinafter also referred to as an image plane 30, such as but not limited to a CCD array, phosphorescent screen, photographic film, microbolometer array, or other means of detecting light energy, hereinafter referred to generally as the detector, through an optical system 40 comprising either refractive or reflective elements or combination thereof. In this embodiment, optical system 40 comprises refractive elements 52, 53, 54, 55, 56, 62, 63, 64, 65, 66, and 70. A view of a representative image 32 at the image plane 30 for this embodiment 100, taken along a plane perpendicular to the optical axis 10, is shown next to the image plane 30.

The first order imaging relationship between the object and image plane positions of an optical relay imaging system is given as $$\frac{1}{s_o} + \frac{1}{s_i} = \frac{1}{f}$$

where $s_o$, $s_i$, and f are the first order object distance, image distance, and focal length of the system respectively. From this relationship, the image distance for a corresponding object distance can therefore be calculated as $$s_i = \frac{fs_o}{s_o - f}.$$

The first order object to image distance D is given to be $$D = s_o + s_i$$

and substitution of the above expression for the image distance in terms of the object distance yields the first order relationship $$D = s_o + s_i = s_o + \frac{fs_o}{s_o - f} = \frac{s_o^2}{s_o - f}.$$

Differentiating this expression with respect to small changes in the object distance results in $$\frac{\partial D}{\partial s_o} = \frac{\partial}{\partial s_o}\left(\frac{s_o^2}{s_o - f}\right) = \frac{2s_o(s_o - f) - s_o^2}{(s_o - f)^2} = \frac{(s_o - f)^2 - f^2}{(s_o - f)^2} = 1 - \frac{f^2}{(s_o - f)^2}.$$

The nominal first order magnification, m, of an optical relay system is given by $$m = \frac{s_i}{s_o}.$$

For a relay system with a nominal magnification of unity, the object and image distances $s_o$ and $s_i$ are therefore equal to one another and can be expressed in terms of the focal length as $$s_o = s_i = 2f$$

which when substituted into the differential equation above results in $$\frac{\partial D}{\partial s_o} = \frac{\partial}{\partial s_o}\left(\frac{s_o^2}{s_o - f}\right) = 1 - \frac{f^2}{(2f - f)^2} = 0.$$

The significance of this relationship is that for a unity magnification optical relay, small changes in the object distance can be compensated for by the image distance such that the object to image distance is maintained.

Substitution of the expression for the image distance in terms of the object distance into the expression for the system magnification results in $$m = \frac{s_i}{s_o} = \frac{f}{s_o - f}$$

and differentiation of that expression with respect to small changes in the object distance results in $$\frac{\partial m}{\partial s_o} = \frac{\partial}{\partial s_o}\left(\frac{f}{s_o - f}\right) = \frac{-f}{(s_o - f)^2} = -\frac{1}{f}.$$

The significance of this relationship is that for a unity magnification optical relay, small changes in the object distance produce a substantially linear change in magnification that is inversely proportional to the focal length of the relay, while the object plane to image plane distance remains substantially unchanged.

Reference is made to FIGS. 2A and 2B, there are illustrated schematic views of an optical imaging system 200, taken along its optical axis, in accordance with an embodiment of the present disclosure.

Reference is made to FIG. 2A, an optical imaging system 200 including relay imager 40 illustrated in FIG. 1. In one embodiment, relay imager 40, which comprises, but not limited to, refractive elements 52, 53, 54, 55, 56, 62, 63, 64, 65, 66, and 70, is translated along the optical axis 10 towards the object plane 30 according to the first order optical relationships described herein such that the magnification of the optical imaging system 200 is increased relative to that of the optical imaging system 100 illustrated in FIG. 1, while the distance between the object plane 20 and the image plane 30 is maintained. A view of a representative image 232 at the image plane 30 for this embodiment 200, taken along a plane perpendicular to the optical axis 10, is shown next to the image plane 30.

Reference is also made to FIG. 2B, an optical imaging system 300 including relay imager 40 illustrated in FIG. 1. In one embodiment, relay imager 40, which comprises, but not limited to, refractive elements 52, 53, 54, 55, 56, 62, 63, 64, 65, 66, and 70, is translated along the optical axis 10 towards the image plane 30 according to the first order optical relationships described herein such that the magnification of the optical imaging system 300 is decreased relative to that of the optical imaging system 100 illustrated in FIG. 1, while the distance between the object plane 20 and the image plane 30 is maintained. A view of a representative image 332 at the image plane 30 for this embodiment 300, taken along a plane perpendicular to the optical axis 10, is shown next to the image plane 30.

Reference is made to FIG. 3A, which is a schematic view of a refractive relay spectrometer 400, taken along an optical axis 410 in the plane parallel to the direction of dispersion. See, for example, U.S. Pat. No. 7,061,611, which is incorporated herein by reference in its entirety for all purposes. In operation, light emitted or reflected by a source located at the object plane (for example, a slit or other method of extracting a line image, hereinafter referred to generally as a slit element 420) is incident on an optical relay imager 440. In one embodiment, a refractive relay spectrometer 400 comprises, but not limited to, refractive elements 452, 453, 454, 455, 456, 462, 463, 464, 465, and 466 and a dispersing element 470.

In one embodiment, dispersing element 470 is a transmission diffraction grating, which can separate light energy angularly according to its wavelength (hereinafter referred to generally as a dispersing element). The optical relay imager 440 is capable of substantially receiving a portion of the light emanating from the slit 420 and substantially reimaging the light from the slit 420 and dispersing it according to its wavelength and substantially focusing the light to an image plane 430. A view of a representative image 432 at the image plane 430 for refractive relay spectrometer 400, taken along a plane parallel to image plane 430, is shown next to the image plane 430.

Reference is made to FIG. 3B, which is a schematic view of refractive relay spectrometer 400, taken along its optical axis 410 in the plane perpendicular to the direction of dispersion. In operation, light emanating from the slit element 420 is imaged by the optical relay imager 440 onto the image plane 430 in this embodiment with, but not limited to, unity magnification.

Reference is made to FIG. 4A, which illustrates a schematic view of an optical imaging system 500, taken along its optical axis 410 in the plane parallel to the direction of dispersion, in accordance with an embodiment of the present disclosure. In this embodiment, the relay imager 440 of the spectrometer 400 illustrated in FIG. 3A is translated along the optical axis 410 towards the slit 420 according to the first order optical relationships described herein such that the magnification of the optical imaging system 500 is increased relative to that of the optical imaging system 400 illustrated in FIG. 3A, while the distance between the slit 420 and the image plane 430 is maintained. A view of a representative image 532 at the image plane 430 for optical imaging system 500, taken along a plane parallel to the image plane 430, is shown next to the image plane 430.

Reference is also made to FIG. 4B, which illustrates a schematic view of an optical imaging system 600, taken along the optical axis 410 in the plane parallel to the direction of dispersion, in accordance with an embodiment of the present disclosure. In this embodiment, the relay imager 440 of the spectrometer 400 illustrated in FIG. 3A is translated along the optical axis 410 towards the image plane 430 according to the first order optical relationships described herein such that the magnification of the optical imaging system 600 is decreased relative to that of the optical imaging system 400 illustrated in FIG. 3A, while the distance between the slit 420 and the image plane 430 is maintained. A view of a representative image 632 at the image plane 430 for optical imaging system 600, taken along a plane parallel to the image plane 430, is shown next to the image plane 430.

The translation of the relay imager 40 in the embodiments of the optical imaging systems 200 and 300 and the translation of the relay imager 440 in the embodiments of the optical imaging systems 500 and 600 can be accomplished through any number of means, including but not limited to, a moveable platform, having the platform attached to rails and having a component such as but not limited to a drive motor or screw, that causes the motion of the platform, or by mounting the relay imager within a mechanical housing that is translated by means of displacing components such as but not limited to shims or spacers.

In addition to changing the magnification of the hyperspectral imager, the optical system 400 illustrated in FIG. 3A is also capable of changing the spectral resolution of the optical system, as the relay imager 440 is translated along the optical axis 410, where translation towards the slit 420 increases the spectral resolution and translation towards the detector 430 decreases the spectral resolution. It should be noted that the relay imager components of the various embodiments can be made up of any combination of refractive or reflective optical elements.

As used herein, the singular forms "a," "an," and "the" include the plural reference unless the context clearly dictates otherwise. Except where otherwise indicated, all numbers expressing quantities of ingredients, reaction conditions, and so forth used in the specification and claims are to be understood as being modified in all instances by the term "about."

For the purpose of better describing and defining the present invention, it is noted that terms of degree (e.g., "substantially," "about," and the like) may be used in the specification and/or in the claims. Such terms of degree are utilized herein to represent the inherent degree of uncertainty that may be attributed to any quantitative comparison, value, measurement, and/or other representation. The terms of degree may also be utilized herein to represent the degree by which a quantitative representation may vary (e.g., ±10%) from a stated reference without resulting in a change in the basic function of the subject matter at issue.

Although embodiments of the present teachings have been described in detail, it is to be understood that such embodiments are described for exemplary and illustrative purposes only. Various changes and/or modifications may be made by those skilled in the relevant art without departing from the spirit and scope of the present disclosure as defined in the appended claims.

What is claimed is:

1. An optical imaging system defining an optical axis, comprising:
   an object plane and an image plane, wherein the object plane and the image plane are separated by a fixed distance;
   an optical sub-system located along the optical axis and optically disposed between the object plane and the image plane, the optical sub-system being configured to substantially image electromagnetic radiation emanating from the object plane onto the image plane; and
   at least one detecting element located substantially at the image plane;
   wherein the optical sub-system is configured to mechanically translate along the optical axis while substantially focusing the light to the image plane; the translation producing a change in magnification and a change in spectral resolution while the fixed distance from the object plane to the image plane and a focal length of the optical imaging system remain substantially unchanged.

2. The optical imaging system of claim 1 wherein the optical sub-system includes at least one refractive element.

3. The optical imaging system of claim 1 wherein the optical sub-system includes at least one reflective element.

4. A spectrometer defining an optical axis, comprising:
   at least one slit element located at an object plane;
   a first optical sub-system disposed along the optical axis and configured to substantially collimate, at a center plane, electromagnetic radiation emanating from said at least one slit element;
   at least one dispersive element located substantially at the center plane;
   a second optical sub-system disposed along the optical axis and configured to substantially image the substantially collimated electromagnetic radiation from the center plane onto an image plane; and
   at least one detecting element located substantially at the image plane;
   wherein said first optical sub-system and said second optical sub-system are configured to mechanically translate along the optical axis while substantially focusing the light to the image plane; the translation producing a change in magnification and a change in spectral resolution while a fixed distance from the object plane to the image plane and a focal length of the first optical sub-system and a focal length of the second optical sub-system remain substantially unchanged.

5. The spectrometer of claim 4, wherein said first optical sub-system and said second optical sub-system are substantially located along a portion of said optical axis.

6. The spectrometer of claim 4, wherein said first optical sub-system and said second optical sub-system are optically disposed between said object plane and said image plane.

7. The spectrometer of claim 4 wherein said first optical sub-system includes at least one refractive or reflective optical element.

8. The spectrometer of claim 4 wherein said second optical sub-system includes at least one refractive or reflective optical element.

9. A method for varying magnification of an optical system, comprising:
   substantially imaging electromagnetic radiation emanating from a source through an optical relay;
   detecting the electromagnetic radiation with a detecting element; and
   mechanically translating the optical relay substantially along an optical axis of the optical relay while substantially focusing the light to the image plane; translation of the optical relay producing a change in magnification and a change in spectral resolution while a fixed distance from the object plane to the image plane and a focal length remain substantially unchanged.

10. The method of claim 9 further comprising:
    angularly separating according to wavelength, after substantially imaging and before detecting, the electromagnetic radiation imaged through the optical relay.

* * * * *